United States Patent [19]
Tanaka et al.

[11] Patent Number: 5,487,162
[45] Date of Patent: Jan. 23, 1996

[54] CACHE LOCK INFORMATION FEEDING SYSTEM USING AN ADDRESS TRANSLATOR

[75] Inventors: Tetsuya Tanaka, Osaka; Takashi Taniguchi, Moriguchi, both of Japan

[73] Assignee: Matsushita Electric Industrial Co., Ltd., Osaka, Japan

[21] Appl. No.: 338,818

[22] Filed: Nov. 10, 1994

Related U.S. Application Data

[63] Continuation of Ser. No. 841,106, Feb. 25, 1992, abandoned.

[51] Int. Cl.⁶ ........................................ G06F 12/08
[52] U.S. Cl. ........................ 395/472; 364/DIG. 1; 364/243.41; 395/403; 395/413
[58] Field of Search ...................... 395/425, 725, 395/403, 412, 415, 416, 417, 471, 472; 364/200 MS File, 900 MS File

[56] References Cited

U.S. PATENT DOCUMENTS

| | | | |
|---|---|---|---|
| 4,638,426 | 1/1987 | Chang et al. | 395/400 |
| 5,029,072 | 7/1991 | Moyer et al. | 395/425 |
| 5,163,143 | 11/1992 | Culley et al. | 395/425 |
| 5,168,568 | 12/1992 | Thayer et al. | 395/725 |
| 5,249,286 | 9/1993 | Alpert et al. | 395/425 |
| 5,297,270 | 3/1994 | Olson | 395/425 |

OTHER PUBLICATIONS

"Sparc Risc User's Guide" by Cypress Semiconductor, Feb. 1990, pp. 4–18 to 4–19 and 4–34 to 4–35.

*Primary Examiner*—Matthew M. Kim
*Attorney, Agent, or Firm*—Lowe, Price, LeBlanc & Becker

[57] ABSTRACT

A method and apparatus for cache lock control are designed for use with a cache memory. The cache memory contains a number of data entries, each divided into segments for storing address information, data, and a cache lock bit, respectively. The cache lock bit, when set in a data entry, prevents updating the address and data in that data entry. An address translator is provided for converting virtual memory addresses to physical addresses. The address translator includes address entries which include at least one segment for storing cache lock information, and cache lock information is transferred from the address translator to the cache memory.

3 Claims, 8 Drawing Sheets

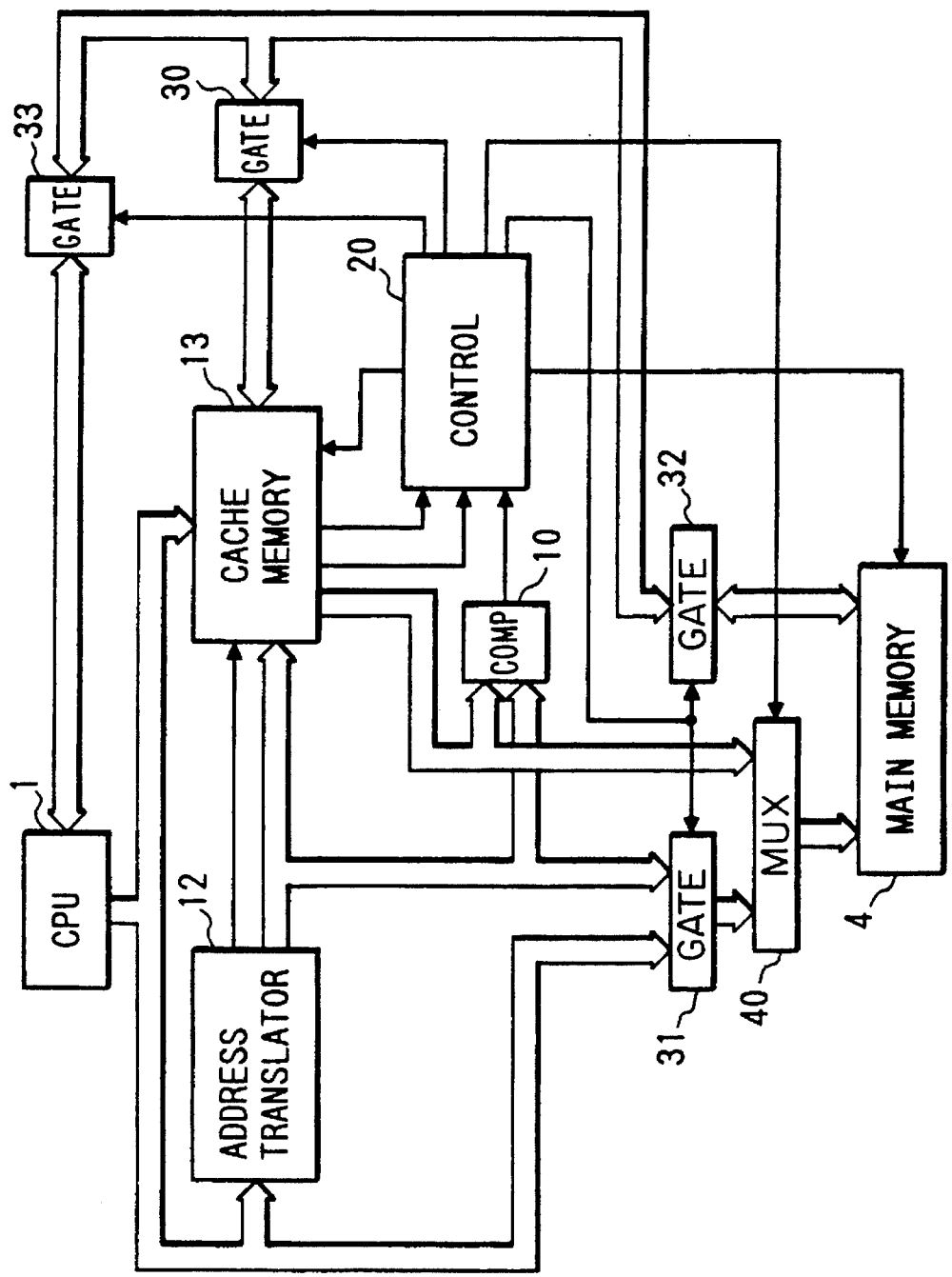

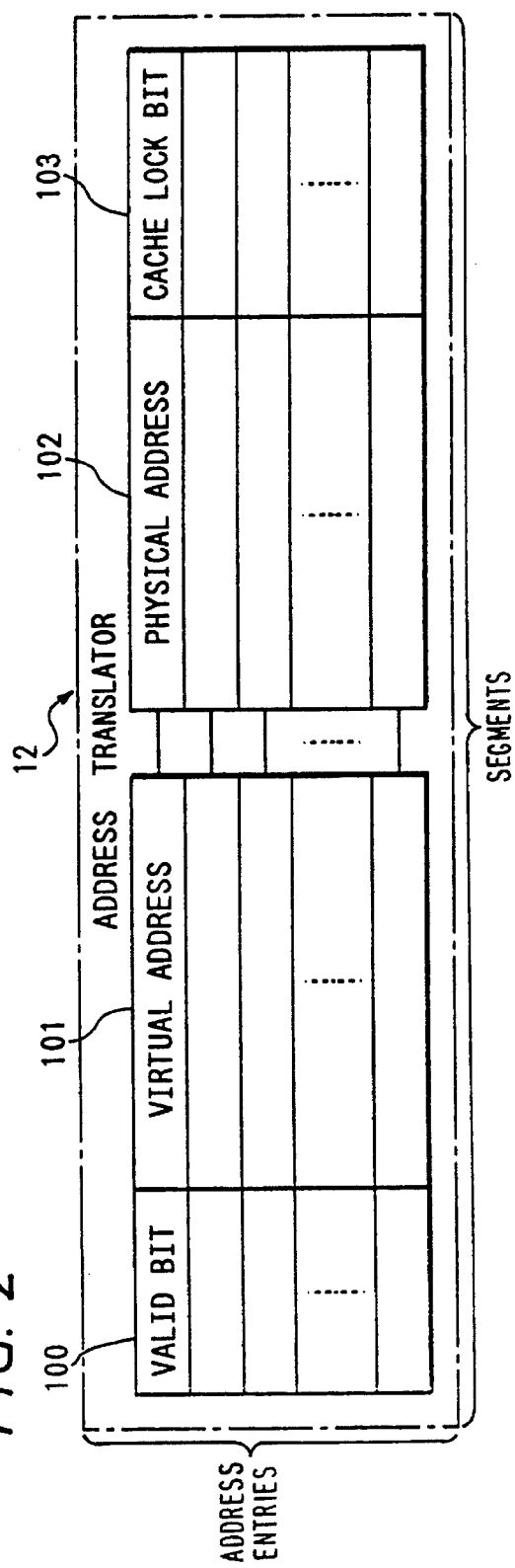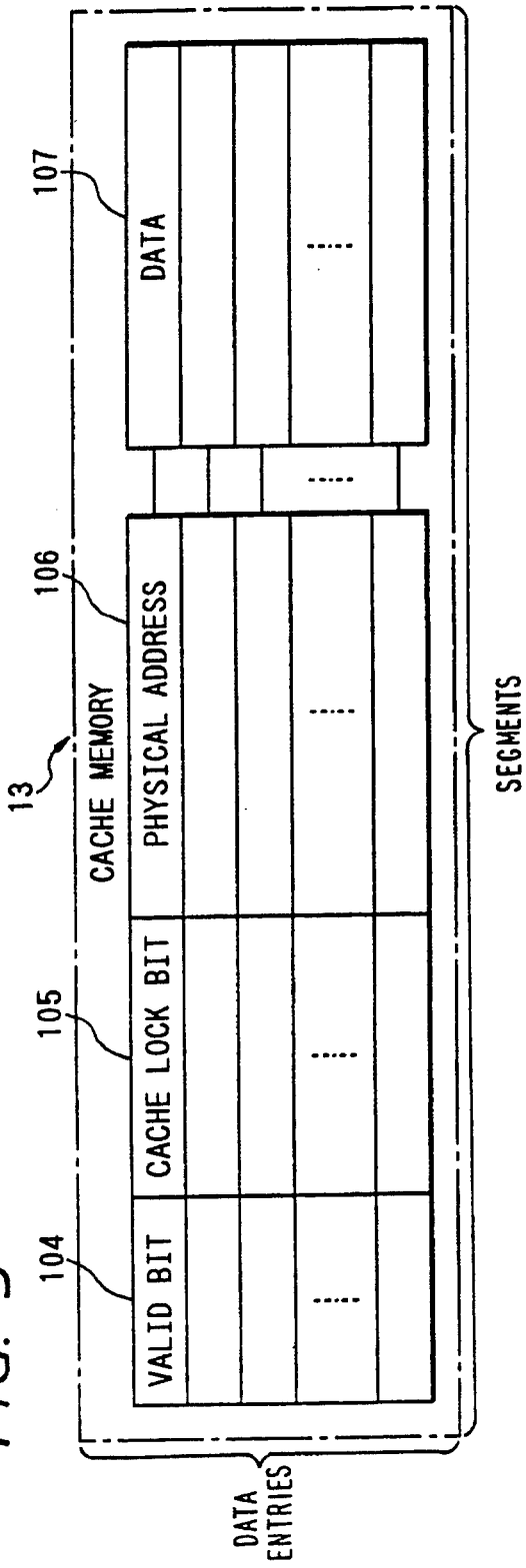

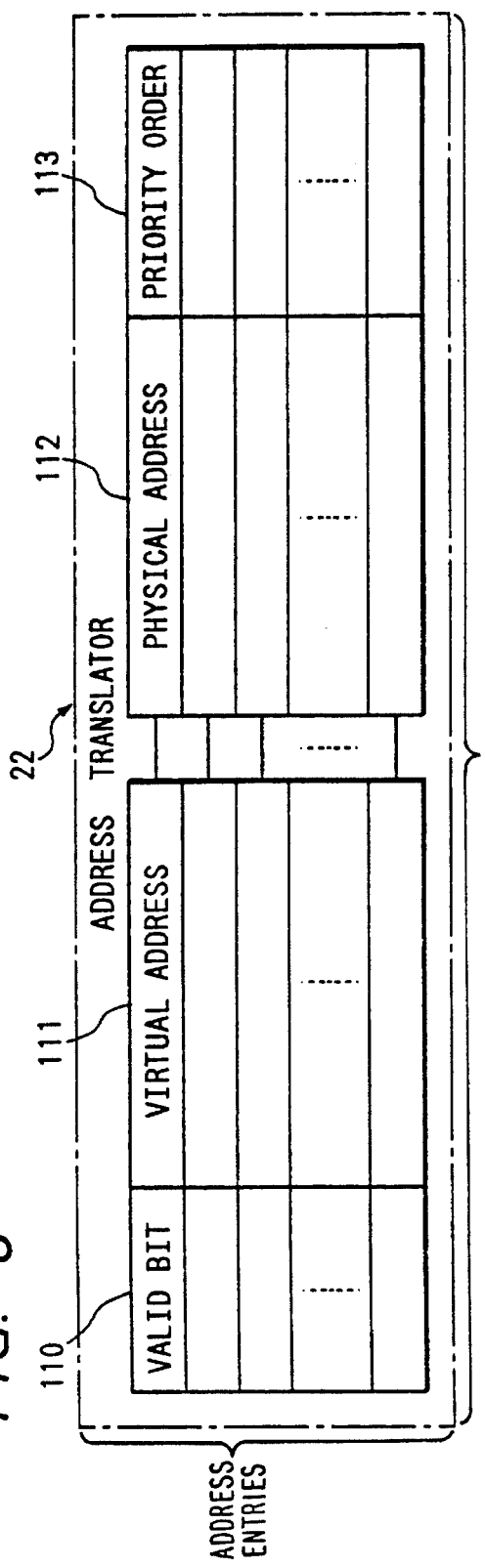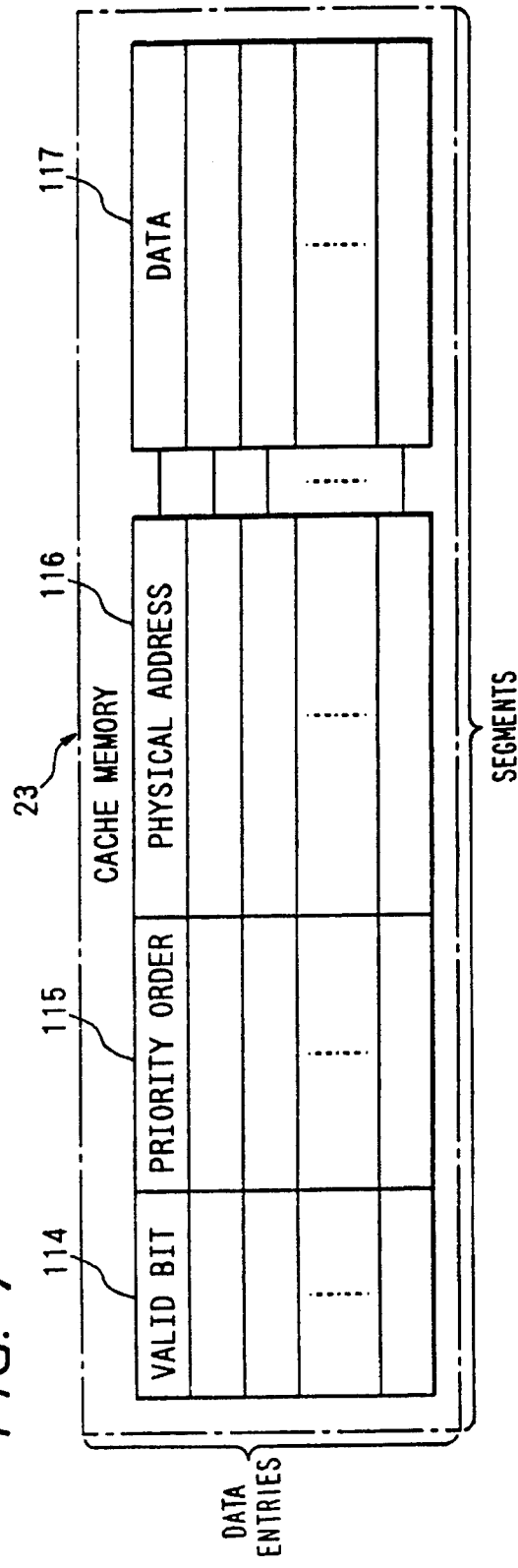

CACHE LOCK INFORMATION FEEDING SYSTEM USING AN ADDRESS TRANSLATOR

This application is a continuation of application Ser. No. 07/841,106 filed Feb. 25, 1992, now abandoned.

BACKGROUND OF THE INVENTION

This invention relates to a method and an apparatus for cache lock control which are usable in an information processing system including a cache memory.

In general, a cache memory is connected between a CPU and a main memory in an information processing system. The cache memory is a small and fast storage buffer which temporarily stores data used by the CPU. When data required by the CPU is present in the cache memory, the CPU uses the data in the cache memory and therefore it is unnecessary for the CPU to execute access to the main memory. As the CPU is allowed to more frequently use the cache memory, an average time spent in access to data can be shorter.

Since the capacity of the cache memory is smaller than the capacity of the main memory, the cache memory can store a limited quantity of data which equals only a part of all the data in the main memory. Accordingly, in the cache memory, there is a possibility that data used by the CPU at a high frequency is replaced by data used by the CPU at a low frequency. From the standpoint of fast access to data, it is desirable to inhibit the replacement of data used at a high frequency by data used at a low frequency.

A cache lock arrangement has been developed to inhibit the updating of data, in the cache memory, which is used by the CPU at a high frequency or which should be quickly fed to the CPU. Cache memories such as the model CY7C604/CY7C605 produced by Cypress Semiconductor, use such a cache lock arrangement in an information processing system as disclosed in "SPARC RISC USER'S GUIDE", Feb. 1990.

In a prior art cache lock arrangement, the updating of data in a cache memory can be controllably inhibited, that is, the cache memory can be controllably locked. When data which should be quickly fed to a CPU is preset in the cache memory or when data used by the CPU at a high frequency is present in the cache memory, the cache memory is generally locked.

Data which should be quickly fed to the CPU, and data used by the CPU at a high frequency are now referred to as more-required data. Other data, for example, data used by the CPU at a low frequency, is now referred to as less-required data. In the prior art cache lock arrangement, the cache memory tends to be locked even when only a part of data in the cache memory agrees with more-required data and the other data in the cache memory corresponds to less-required data. In this case, the less-required data continues to be present in the cache memory. The continuous presence of the less-required data in the cache memory lowers an average speed of access to data. Furthermore, after the cache memory is locked, it is generally difficult to replace such less-required data by more-required data.

SUMMARY OF THE INVENTION

It is an object of this invention to provide an improved apparatus for cache lock control.

It is another object of this invention to provide an improved method of cache lock control.

A first aspect of this invention provides an apparatus for cache lock control which comprises a cache memory having divided entries each for storing data and cache lock information; and means for controlling updating of data in each of the entries of the cache memory in response to cache lock information in each of the entries of the cache memory.

A second aspect of this invention provides an apparatus for cache lock control which comprises a cache memory having divided entries each for storing data and priority order information; an address translator having divided entries each for storing priority order information; means for selecting one of the entries of the cache memory and one of the entries of the address translator; means for comparing priority order information in the selected entry of the cache memory and priority order information in the selected entry of the address translator; and means for controlling updating of data in the selected entry of the cache memory in response to a result of said comparing by the comparing means.

A third aspect of this invention provides an apparatus for cache lock control which comprises a cache memory for storing a set of data and information representing whether updating of data in the cache memory is allowed or inhibited; means for updating the data in the cache memory; and means for selectively allowing and inhibiting said updating of the data in response to contents of the information.

A fourth aspect of this invention provides a method of cache lock control which comprises the steps of storing data and cache lock information into each of divided entries of a cache memory; and controlling updating of data in each of the entries of the cache memory in response to cache lock information in each of the entries of the cache memory.

A fifth aspect of this invention provides a method of cache lock control which comprises the steps of storing data and priority order information into each of divided entries of a cache memory; storing priority order information into each of divided entries of an address translator; selecting one of the entries of the cache memory and one of the entries of the address translator; comparing priority order information in the selected entry of the cache memory and priority order information in the selected entry of the address translator; and controlling updating of data in the selected entry of the cache memory in response to a result of said comparing by the comparing step.

BRIEF DESCRIPTION OF THE DRAWINGS

FIG. 1 is a block diagram of an information processing system having a cache lock arrangement according to a first embodiment of this invention FIG. 2 is a diagram of the address translator of FIG. 1.

FIG. 3 is a diagram of the cache memory of FIG. 1.

FIG. 6 is diagram of the address translator of FIG. 5.

FIG. 7 is a diagram of the cache memory of FIG. 5.

DESCRIPTION OF THE FIRST PREFERRED EMBODIMENT

Figure 4A:
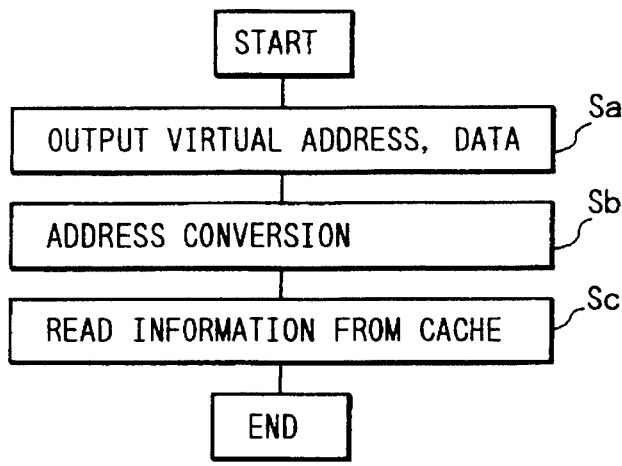
FIG. 4A is a flowchart of a part of a program operating the CPU of FIG. 1.

With reference to FIG. 1, an information processing system having a cache lock arrangement includes a CPU 1, an address translator (an address converter) 12, a cache memory 13, a main memory 4, a comparator 10, a controller 20, gates 30, 31, 32, and 33, and a selector 40.

The address translator 12 is also referred to as a "TLB". The address translator 12 generally includes a pair of a CAM and a RAM for storing virtual (logical) addresses and physical addresses respectively. The CAM includes word segments. The RAM includes word segments which correspond to the word segments of the CAM respectively. The CAM compares an input virtual address sequentially with virtual addresses in the respective word segments thereof. The word segment of the CAM, which stores the virtual address equal to the input address, feeds a word selection signal to the corresponding word segment of the RAM so that the word segment of the RAM will output a physical address. In this way, the address translator 12 converts the input virtual address into the corresponding physical address.

The address translator 12 will be further described. As shown in FIG. 2, the address translator 12 includes divided segments corresponding to entries respectively and each having storages 100, 101, 102, and 103 for storing valid (effective) bit information, a given higher bit part of a virtual address, a given higher bit part of a physical address, and cache lock bit information, respectively. It should be noted that the divided segments of the address translator 12 are also referred to simply as entries.

The cache memory 13 is of the physical and direct-map type. As shown in FIG. 3, the cache memory 13 includes divided segments corresponding to entries respectively and each having storages 104, 105, 106, and 107 for storing valid (effective) bit information, cache lock bit information, a given higher bit part of a physical address, and general data respectively. It should be noted that the divided segments of the cache memory 13 are also referred to simply as entries.

The CPU 1 includes a processing section and a ROM. The CPU 1 operates in accordance with a program stored in the ROM. The program has a section for a data writing process. FIG. 4A is a flowchart of the data writing section of the program. The operation of the information processing system of FIG. 1 will be described hereinafter with reference to FIG. 4A.

When the data writing process is started, a step Sa of FIG. 4A is executed first. At the step Sa, the CPU 1 outputs a virtual address and related data. A higher bit part of the virtual address is inputted into the address translator 12 from the CPU 1. A lower bit part of the virtual address is inputted into the cache memory 13 and the gate 31 from the CPU 1. The data is inputted into the gate 33 from the CPU 1. The cache memory 13 selects one of its entries in response to the inputted lower bit part of the virtual address.

At a step Sb following the step Sa, the CPU 1 controls the address translator 12 so that the address translator 12 will sequentially compare the higher bit part of the currently-inputted virtual address with higher bit parts of virtual addresses stored in the respective entries thereof. During the comparison, the address translator 12 selects one of the entries which stores the virtual-address higher bit part equal to the currently-inputted virtual-address higher bit part. The CPU 1 controls the address translator 12 so that the address translator 12 will output cache lock bit information from the cache lock bit storage 103 of the selected entry to the cache memory 13, and that the address translator 12 will output a higher bit part of a physical address from the physical address storage 102 of the selected entry to the cache memory 13, the comparator 10, and the gate 31.

A step Sc following the step Sb, the CPU 1 controls the cache memory 13 so that the cache memory 13 will output a higher bit part of a physical address to the comparator 10 and the selector 40 from its entry selected in response to the inputted lower bit part of the virtual address, and that the cache memory 13 will output cache lock bit information and valid bit information to the controller 20 from the selected entry thereof. The comparator 10 compares the physical-address higher bit part outputted from the cache memory 13 and the physical-address higher bit part outputted from the address translator 12. When the physical-address higher bit part outputted from the cache memory 13 agrees with the physical-address higher bit part outputted from the address translator 12, the comparator 10 outputs a high-level hit signal to the controller 20. When the physical-address higher bit part outputted from the cache memory 13 disagrees with the physical-address higher bit part outputted from the address translator 12, the comparator 10 outputs a low-level hit signal to the controller 20.

Figure 4B:
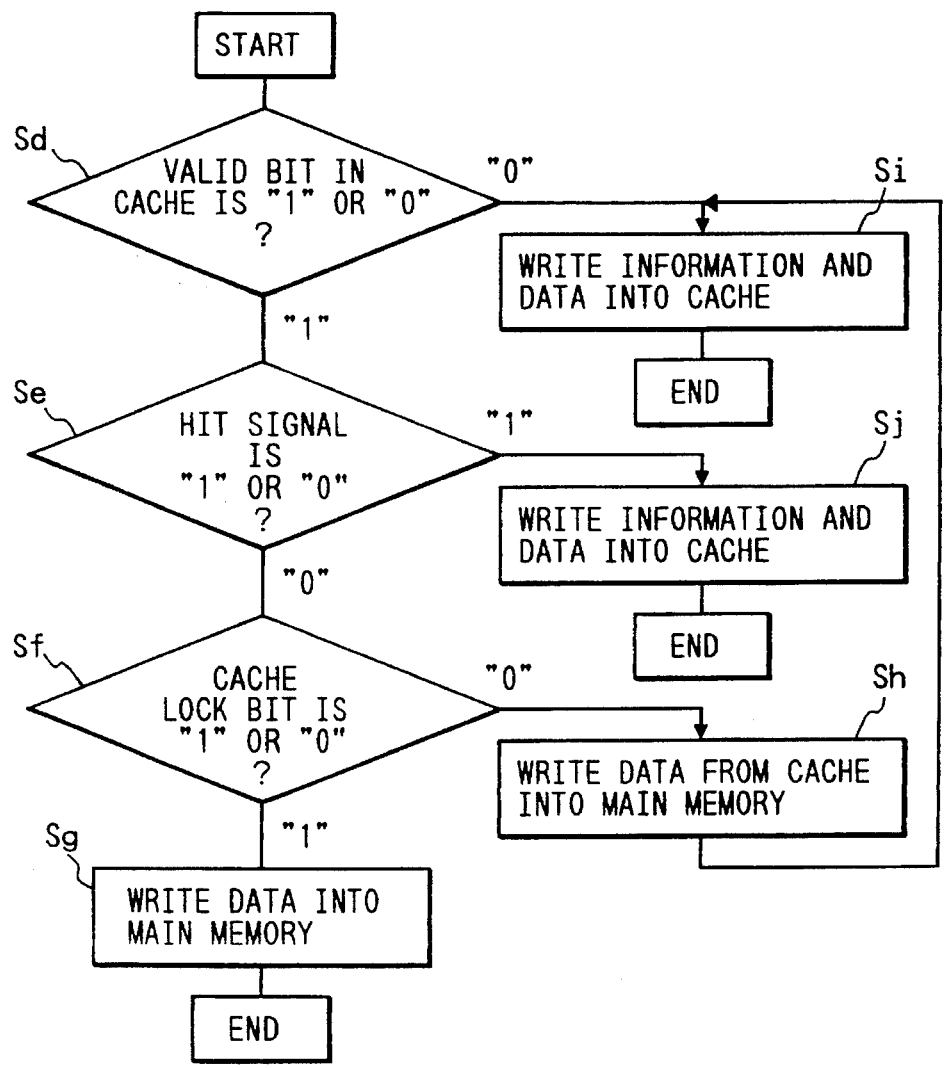
FIG. 4B is a flow chart of a part of a program operating the controller of FIG.

The controller 20 includes a processing section and a ROM. The controller 20 operates in accordance with a program stored in the ROM. FIG. 4B is a flowchart of the program operating the controller 20. In general, the program operating the controller 20 is started by an instruction from the CPU 1.

As shown in FIG. 4B, a first step Sd of the program operating the controller 20 decides whether the inputted valid bit information corresponds to a high level or a low level. When the inputted valid bit information corresponds to the high level, the program advances to a step Se. When the inputted valid bit information corresponds to the low level, the program advances to a step Si.

The step Se decides whether or not the inputted hit signal corresponds to a high level or a low level. When the inputted hit signal corresponds to the high level, the program advances to a step Sj. When the inputted hit signal corresponds to the low level, the program advances to a step Sf.

The step Sf decides whether or not the inputted cache lock bit information corresponds to a high level or a low level. When the inputted cache lock bit information corresponds to the high level, the program advances to a step Sg. When the inputted cache lock bit information corresponds to the low level, the program advances to a step Sh.

The step Sg changes the gates 31, 32, and 33 to their on (conductive) states but changes the gate 30 to its off (non-conductive) state. The lower bit part of the virtual address outputted from the CPU 1 and the higher bit part of the physical address outputted from the address translator 12 are combined by the gate 31 into a complete physical address. The gate 31 outputs the complete physical address to the selector 40. The step Sg controls the selector 40 so that the selector 40 will select the output signal from the gate 31 which represents the complete physical address. The selector 40 outputs the selected complete physical address to the main memory 4. The CPU 1 outputs data to the main memory 4 via the gates 32 and 33. The step Sg outputs a write signal to the main memory 4 so that the data outputted from the CPU 1 will be written into a storage segment of the main memory 4 which is designated by the complete physical address. After the step Sg, the current execution cycle of the program ends.

The step Sh changes the gates 30 and 32 to their on (conductive) states but changes the gates 31 and 33 to their off (non-conductive) states, In addition, the step Sh controls the selector 40 so that the selector 40 will select the output signal from the cache memory 13 which represents the higher bit part of the physical address in the selected entry. The selector 40 transmits the higher bit part of the physical address to the main memory 4. The step Sh feeds a read signal to the cache memory 13 so that the cache memory 13 will output data from its selected entry to the main memory 4 via the gates 30 and 32. The step Sh feeds a write signal to the main memory 4 so that the data outputted from the cache memory 13 will be written into a storage segment of the main memory 4 which is designated by the higher bit part of the physical address. After the step Sh, the program advances to the step Si.

The step Si changes the gates 30, 31, and 32 to their on (conductive) states but changes the gate 33 to its off (non-conductive) state. The lower bit part of the virtual address outputted from the CPU 1 and the higher bit part of the physical address outputted from the address translator 12 are combined by the gate 31 into a complete physical address. The gate 31 outputs the complete physical address to the selector 40. The step Si controls the selector 40 so that the selector 40 will select the output signal from the gate 31 which represents the complete physical address. The selector 40 outputs the selected complete physical address to the main memory 4. The step Si outputs a read signal to the main memory 4 so that data will be read out from a storage segment of the main memory 4 which is designated by the complete physical address. The read-out data is applied from the main memory 4 to the cache memory 13 via the gates 30 and 32. The step Si feeds a write signal to the cache memory 13 and thereby controls the cache memory 13 so that the higher bit part of the physical address outputted from the address translator 12, the cache lock bit information outputted from the address translator 12, and the data transmitted from the main memory 4 will be written into the selected entry of the cache memory 13. In this way, the cache lock bit information is transferred from the address translator 12 to the cache memory 13, and the data is transferred from the main memory 4 to the cache memory 13. At the same time, the valid bit in the selected entry of the cache memory 13 is changed to a set state by the step Si. It should be noted that the data written into the cache memory 13 from the main memory 4 by the step Si differs from the data written into the main memory 4 from the cache memory 13 by the step Sh. Thus, the data in the selected entry of the cache memory 13 is updated by the step Si.

Then, the controller 20 controls the cache memory 13 in order to execute a process of writing and adding new data into the selected entry of the cache memory 13. This process is done in view of the fact that the size (generally, 32 bytes) of an entry of the cache memory 13 is greater than the size (generally, 1 to 8 bytes) of data written by the CPU 1. Specifically, the step Si changes the gates 30 and 33 to their on states but changes the gates 31 and 32 to their off states. Data outputted from the CPU 1 is applied to the cache memory 13 via the gates 30 and 33. The step Si feeds a write signal to the cache memory 13 and thereby controls the cache memory 13 so that the data outputted from the CPU 1 will be written into the selected entry of the cache memory 13. After the step Si, the current execution cycle of the program ends.

The step Sj changes the gates 30 and 33 to their on states but changes the gates 31 and 32 to their off states. Data outputted from the CPU 1 is applied to the cache memory 13 via the gates 30 and 33. The step Sj feeds a write signal to the cache memory 13 and thereby controls the cache memory 13 so that the data outputted from the CPU 1, the higher bit part of the physical address outputted from the address translator 12, and the cache lock bit outputted from the address translator 12 will be written into the selected entry of the cache memory 13. In this way, the cache lock bit information is transferred from the address translator 12 to the cache memory 13, and the data is transferred from the CPU 1 to the cache memory 13. After the step Sj, the current execution cycle of the program ends.

As understood from the previous description, in the case where a cache lock bit in an entry of the address translator 12 is set, after data designated by a physical address corresponding to the entry is stored into the cache memory 13, the data is prevented from being replaced by other data and thus continues to be present in the cache memory 13. Data which should be continuously stored in the cache memory 13 is now referred to as interesting data. Data which should not be continuously stored in the cache memory 13 is now referred as uninteresting data. The user previously allots interesting data to a page where a cache lock bit is in a set state, and allots uninteresting data to a page where a cache lock bit is in a reset state. During the start of the information processing system or the initialization process related to the information processing system, with respect to interesting data, the CPU 1 registers the set cache lock bit into the address translator 12 together with the virtual address and the physical address of the interesting data. With respect to uninteresting data, the CPU 1 registers the reset cache lock bit into the address translator 12 together with the virtual address and the physical address of the uninteresting data. As a result, only interesting data is allowed to remain in the cache memory 13 while uninteresting data can be temporarily stored in the cache memory 13.

It should be noted that this embodiment may be modified in various ways. For example, the cache memory 13 may be of the logic type or the associative type. While the method of writing into the cache memory 13 is of the write back type in this embodiment, the method may be of the write through type.

DESCRIPTION OF THE SECOND PREFERRED EMBODIMENT

Figure 5:
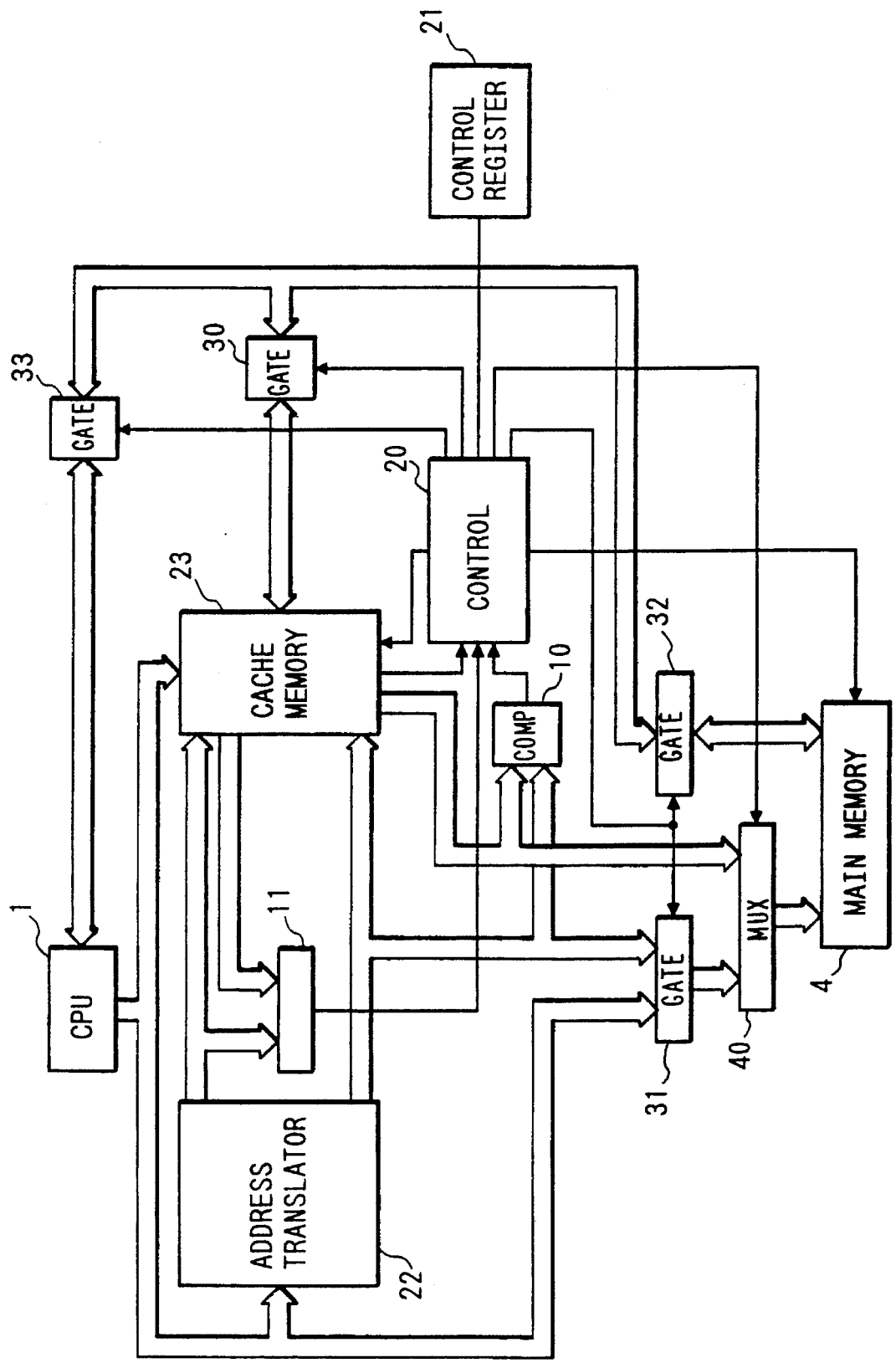
FIG. 5 is a block diagram of an information processing system having a cache lock arrangement according to a second embodiment of this invention.

With reference to FIG. 5, an information processing system having a cache lock arrangement includes a CPU 1, an address translator 22, a cache memory 23, a main memory 4, comparators 10 and 11, a controller 20, gates 30, 31, 32, and 33, and a selector 40.

The address translator 22 is also referred to as a "TLB". The address translator 22 generally includes a pair of a CAM and a RAM for storing virtual (logical) addresses and physical addresses respectively. The CAM includes word segments. The RAM includes word segments which correspond to the word segments of the CAM respectively. The CAM compares an input virtual address sequentially with virtual addresses in the respective word segments thereof. The word segment of the CAM, which stores the virtual address equal to the input address, feeds a word selection signal to the corresponding word segment of the RAM so that the word segment of the RAM will output a physical address. In this way, the address translator 22 converts the input virtual address into the corresponding physical address.

As shown in FIG. 6, the address translator 22 includes divided segments corresponding to entries respectively and each having storages 110, 111, 112, and 113 for storing valid (effective) bit information, a given higher bit part of a virtual address, a given higher bit part of a physical address, and priority order bit information, respectively. It should be noted that the divided segments of the address translator 22 are also referred to simply as entries.

The cache memory 23 is of the physical and direct-map type. As shown in FIG. 7, the cache memory 23 includes divided segments corresponding to entries respectively and each having storages 114, 115, 116, and 117 for storing valid (effective) bit information, priority order bit information, a given higher bit part of a physical address, and general data respectively. It should be noted that the divided segments of the cache memory 23 are also referred to simply as entries.

Figure 8A:
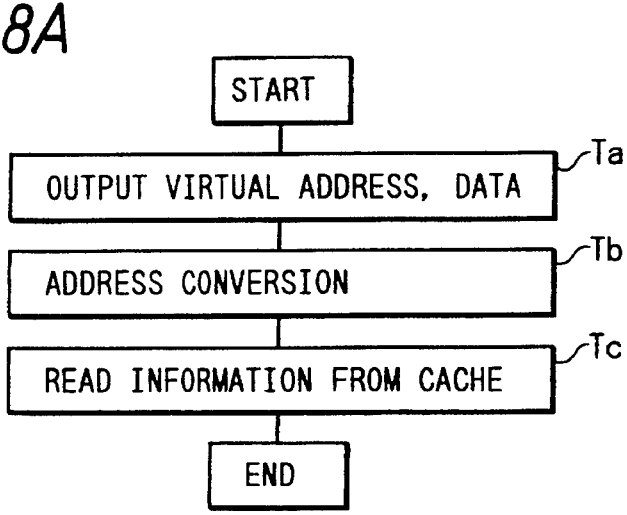
FIG. 8A is a flowchart of a part of a program operating the CPU of FIG. 5.

The CPU 1 includes a processing section and a ROM. The CPU 1 operates in accordance with a program stored in the ROM. The program has a section for a data writing process. FIG. 8A is a flowchart of the data writing section of the program. The operation of the information processing system of FIG. 5 will be described hereinafter with reference to FIG. 8A.

When the data writing process is started, a step Ta of FIG. 8A is executed first. At the step Ta, the CPU 1 outputs a virtual address and related data. A higher bit part of the virtual address is inputted into the address translator 22 from the CPU 1. A lower bit part of the virtual address is inputted into the cache memory 23 and the gate 31 from the CPU 1. The data is inputted into the gate 33 from the CPU 1. The cache memory 23 selects one of its entries in response to the inputted lower bit part of the virtual address.

At a step Tb following the step Ta, the CPU 1 controls the address translator 22 so that the address translator 22 will sequentially compare the higher bit part of the currently-inputted virtual address with higher bit parts of virtual addresses stored in the respective entries thereof. During the comparison, the address translator 22 selects one of the entries which stores the virtual-address higher bit part equal to the currently-inputted virtual-address higher bit part. The CPU 1 controls the address translator 22 so that the address translator 22 will output priority order bit information from the priority order bit storage 113 of the selected entry to the cache memory 23 and the comparator 11, and that the address translator 22 will output a higher bit part of a physical address from the physical address storage 112 of the selected entry to the cache memory 23, the comparator 10, and the gate 31.

A step Tc following the step Tb, the CPU 1 controls the cache memory 23 so that the cache memory 23 will output a higher bit part of a physical address to the comparator 10 and the selector 40 from its entry selected in response to the inputted lower bit part of the virtual address, that the cache memory 23 will output priority order bit information to the comparator 11 from the selected entry thereof; and that the cache memory 23 will output valid bit information to the controller 20 from the selected entry thereof. The comparator 10 compares the physical-address higher bit part outputted from the cache memory 23 and the physical-address higher bit part outputted from the address translator 22. When the physical-address higher bit part outputted from the cache memory 23 agrees with the physical-address higher bit part outputted from the address translator 22, the comparator 10 outputs a high-level hit signal to the controller 20. When the physical-address higher bit part outputted from the cache memory 23 disagrees with the physical-address higher bit part outputted from the address translator 22, the comparator 10 outputs a low-level hit signal to the controller 20. The comparator 11 compares the priority order bit information outputted from the address translator 22 and the priority order bit information outputted from the cache memory 23. When the priority order represented by the output signal from the address translator 22 is higher than the priority order represented by the output signal from the cache memory 23, the comparator 11 outputs a high-level control signal to the controller 20. When the priority order represented by the output signal from the address translator 22 is not higher than the priority order represented by the output signal from the cache memory 23, the comparator 11 outputs a low-level control signal to the controller 20.

Figure 8B:
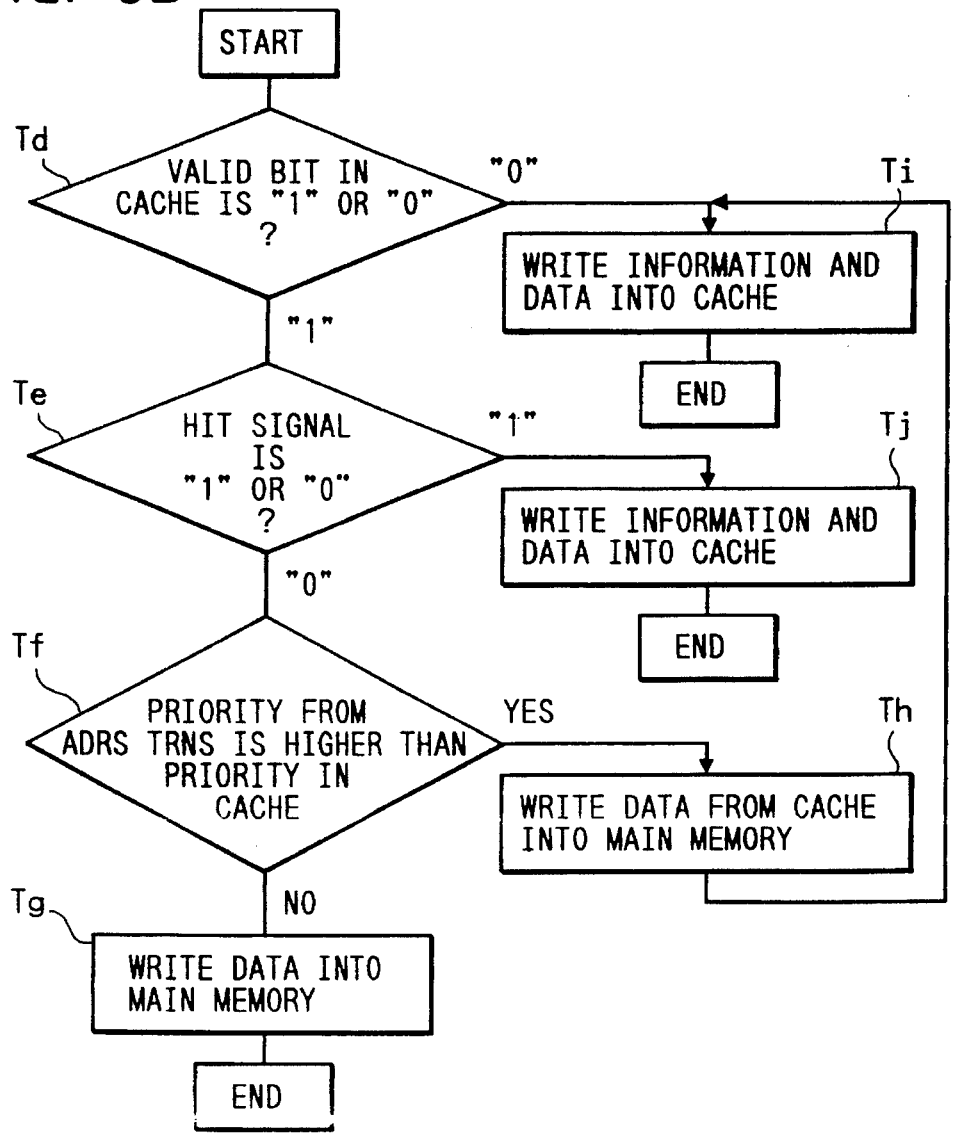
FIG. 8B is a flow chart of a part of a program operating the controller of FIG. 5.

The controller 20 includes a processing section and a ROM. The controller 20 operates in accordance with a program stored in the ROM. FIG. 8B is a flowchart of the program operating the controller 20. In general, the program operating the controller 20 is started by an instruction from the CPU 1.

As shown in FIG. 8B, a first step Td of the program operating the controller 20 decides whether the inputted valid bit information corresponds to a high level or a low level. When the inputted valid bit information corresponds to the high level, the program advances to a step Te. When the inputted valid bit information corresponds to the low level, the program advances to a step Ti.

The step Te decides whether or not the inputted hit signal corresponds to a high level or a low level. When the inputted hit signal corresponds to the high level, the program advances to a step Tj. When the inputted hit signal corresponds to the low level, the program advances to a step Tf.

The step Tf decides whether or not the control signal outputted from the comparator 11 corresponds to a high level or a low level. When the control signal corresponds to the high level, the program advances to a step Tf. When the control signal corresponds to the low level, the program advances to a step Tg.

The step Tg changes the gates 31, 32, and 33 to their on (conductive) states but changes the gate 30 to its off (non-conductive) state. The lower bit part of the virtual address outputted from the CPU 1 and the higher bit part of the physical address outputted from the address translator 22 are combined by the gate 31 into a complete physical address. The gate 31 outputs the complete physical address to the selector 40. The step Tg controls the selector 40 so that the selector 40 will select the output signal from the gate 31 which represents the complete physical address. The selector 40 outputs the selected complete physical address to the main memory 4. The CPU 1 outputs data to the main memory 4 via the gates 32 and 33. The step Tg feeds a write signal to the main memory 4 so that the data outputted from the CPU 1 will be written into a storage segment of the main memory 4 which is designated by the complete physical address. After the step Tg, the current execution cycle of the program ends.

The step Th changes the gates 30 and 32 to their on (conductive) states but changes the gates 31 and 33 to their off (non-conductive) states. In addition, the step Th controls the selector 40 so that the selector 40 will select the output signal from the cache memory 23 which represents the higher bit part of the physical address in the selected entry.

The selector 40 outputs the higher bit part of the physical address to the main memory 4. The step Th feeds a read signal to the cache memory 23 so that the cache memory 23 will output data to the main memory 4 via the gates 30 and 32. The step Th feeds a write signal to the main memory 4 so that the data outputted from the cache memory 23 will be written into a storage segment of the main memory 4 which is designated by the higher bit part of the physical address.

The step Ti changes the gates 30, 31, and 32 to their on (conductive) states but changes the gate 33 to its off (nonconductive) state. The lower bit part of the virtual address outputted from the CPU 1 and the higher bit part of the physical address outputted from the address translator 22 are combined by the gate 31 into a complete physical address. The gate 31 outputs the complete physical address to the selector 40. The step Ti controls the selector 40 so that the selector 40 will select the output signal from the gate 31 which represents the complete physical address. The selector 40 outputs the selected complete physical address to the main memory 4. The step Ti feeds a read signal to the main memory 4 and thereby controls the main memory 4 so that data will be read out from a storage segment of the main memory 4 which is designated by the complete physical address. The read-out data is applied from the main memory 4 to the cache memory 23 via the gates 30 and 32. The step Si feeds a write signal to the cache memory 23 and thereby controls the cache memory 23 so that the higher bit part of the physical address outputted from the address translator 22, the priority order bit information outputted from the address translator 22, and the data transmitted from the main memory 4 will be written into the selected entry of the cache memory 23. In this way, the priority order bit information is transferred from the address translator 22 to the cache memory 23, and the data is transferred from the main memory 4 to the cache memory 23. At the same time, the valid bit in the selected entry of the cache memory 23 is changed to a set state by the step Ti. It should be noted that the data written into the cache memory 23 from the main memory 4 by the step Ti differs from the data written into the main memory 4 from the cache memory 23 by the step Th. Thus, the data in the selected entry of the cache memory 23 is updated by the step Ti.

Then, the controller 20 controls the cache memory 23 in order to execute a process of writing and adding new data into the selected entry of the cache memory 23. This process is done in view of the fact that the size (generally, 32 bytes) of an entry of the cache memory 23 is greater than the size (generally, 1 to 8 bytes) of data written by the CPU 1. Specifically, the step Ti changes the gates 30 and 33 to their on states but changes the gates 31 and 32 to their off states. Data outputted from the CPU 1 is applied to the cache memory 23 via the gates 30 and 33. The step Ti feeds a write signal to the cache memory 13 and thereby controls the cache memory 13 so that the data outputted from the CPU 1 will be written into the selected entry of the cache memory 23. After the step Ti, the current execution cycle of the program ends.

The step Tj changes the gates 30 and 33 to their on states but changes the gates 31 and 32 to their off states. Data outputted from the CPU 1 is applied to the cache memory 23 via the gates 30 and 33. The step Tj feeds a write signal to the cache memory 23 and thereby controls the cache memory 23 so that the data outputted from the CPU 1, the higher bit part of the physical address outputted from the address translator 22, and the priority order bit information outputted from the address translator 22 will be written into the selected entry of the cache memory 23. In this way, the priority bit information is transferred from the address translator 22 to the cache memory 23, and the data is transferred from the CPU 1 to the cache memory 23. After the step Tj, the current execution cycle of the program ends.

Data which should be continuously stored in the cache memory 23 is now referred to as interesting data. Data which should not be continuously stored in the cache memory 23 is now referred as uninteresting data. The user previously allots interesting data to a page where a priority order number is high, and allots uninteresting data to a page where a priority order number is low. During the start of the information processing system or the initialization process related to the information processing system, with respect to interesting data, the CPU 1 registers the high priority order bit information into the address translator 22 together with the virtual address and the physical address of the interesting data. With respect to uninteresting data, the CPU 1 registers the low priority order bit information into the address translator 22 together with the virtual address and the physical address of the uninteresting data. As understood from the previous description, in the case where the priority order represented by the output signal from the address translator 22 is equal to or smaller than the priority order represented by the output signal from the cache memory 23, the related data in the cache memory 23 is prevented from being replaced by other data and thus continues to be present in the cache memory 23. As a result, only data having high priority orders are generally allowed to remain in the cache memory 23 while data having low priority orders can be temporarily stored in the cache memory 23.

It should be noted that this embodiment may be modified in various ways. For example, the cache memory 23 may be of the logic type or the associative type. While the method of writing into the cache memory 23 is of the write back type in this embodiment, the method may be of the write through type. As shown in FIG. 5, a control register 21 for storing cache lock control bit information may be provided in connection with the controller 20, and locking the cache memory 23 may be controlled via the controller 20 in response to the cache lock control bit information fed from the control register 21.

The priority order information is represented by a single bit, two bits, or more bits. The priority order information represented by two or more bits enables sophisticated and smooth control of locking the cache memory 23 in comparison with the 1-bit priority order information.

DESCRIPTION OF THE THIRD PREFERRED EMBODIMENT

Figure 9:
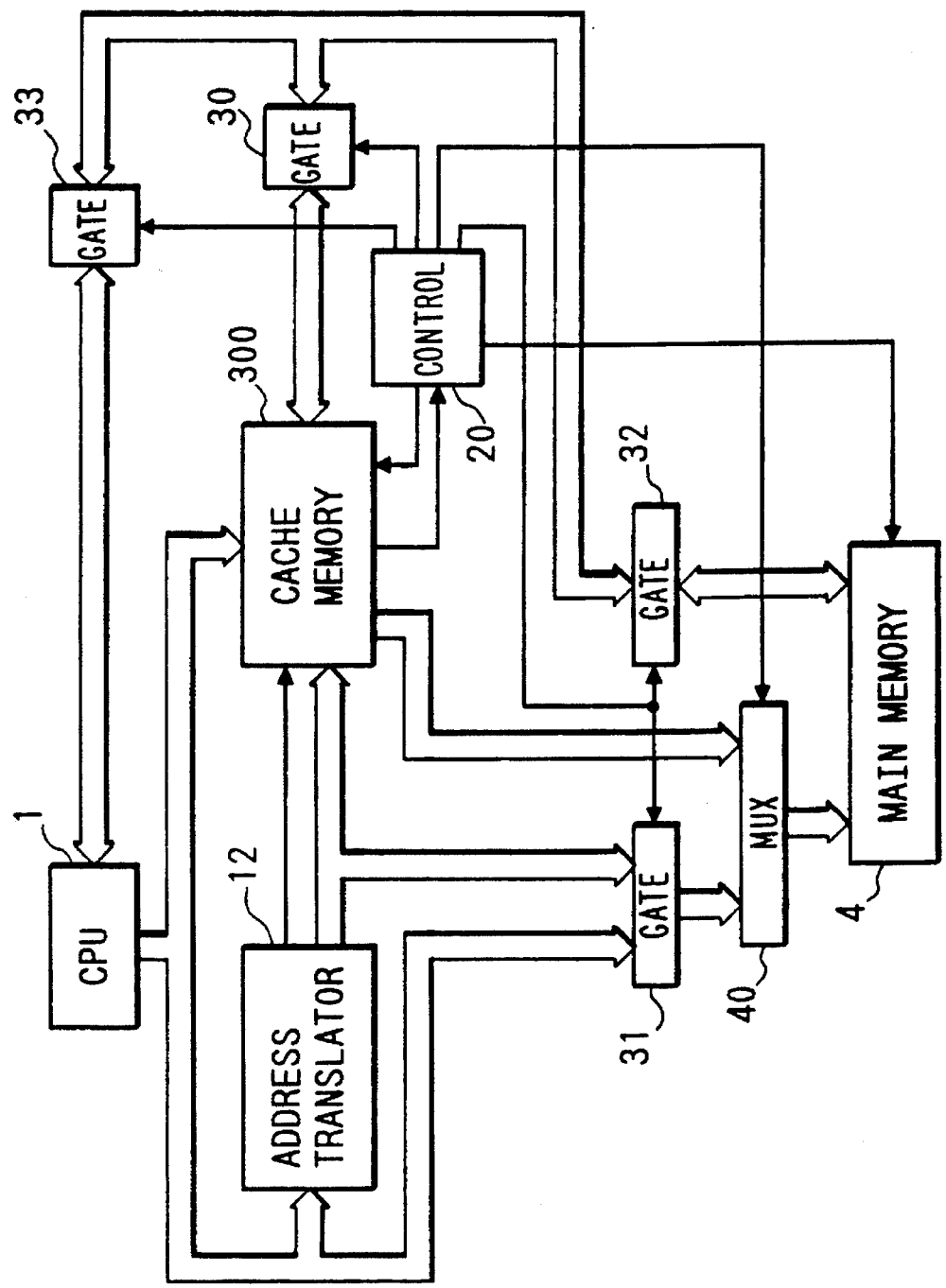
FIG. 9 is a block diagram of an information processing system having a cache lock arrangement according to a third embodiment of this invention.

FIG. 9 shows a third embodiment of this invention which is similar to the embodiment of FIGS. 1–4B except for design changes indicated hereinafter.

The embodiment of FIG. 9 uses a full-associative cache memory 300 in place of the cache memory 13 and the comparator 10 (see FIG. 1).

Figure 10:
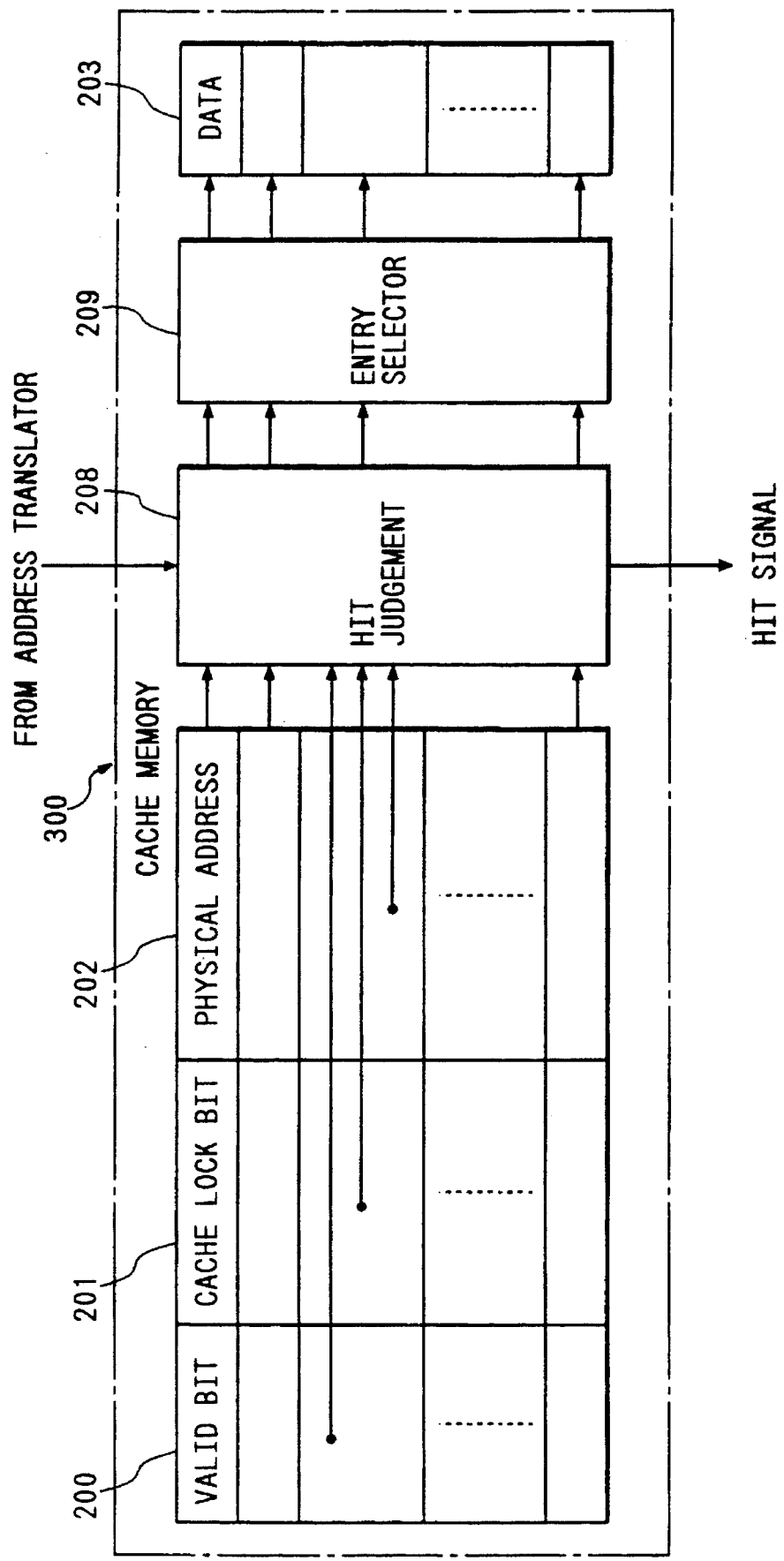
FIG. 10 is a diagram of the cache memory of FIG. 9.

As shown in FIG. 10, the cache memory 300 includes divided segments corresponding to entries respectively and each having storages 200, 201, 202, and 203 for storing valid bit information, cache lock bit information, a given higher bit part of a physical address, and general data respectively. The cache memory 300 also includes a hit judgment circuit 208 and an entry selector 209.

In the hit judgment circuit 208, the higher bit part of the physical address outputted from the address translator 12 is sequentially compared with the higher bit parts of the physical addresses stored in the physical address storages 202 of the respective entries. With respect to the physical-address higher bit part in an entry of the cache memory 300 which agrees with the physical-address higher bit part outputted from the address translator 12, the hit judgment circuit 208 selects the related entry and outputs a high-level hit signal to the controller 20. With respect to the physical-address higher bit part in an entry of the cache memory 300 which disagrees with the physical-address higher bit part outputted from the address translator 12, the hit judgment circuit 208 outputs a low-level hit signal to the controller 20.

In the case where the higher bit part of the physical address outputted from the address translator 12 disagrees with any of the higher bit parts of the physical addresses stored in the physical address storages 202 of the respective entries, the entry selector 209 selects one of the entries which has a reset cache lock bit. This design enables effective use of the entries of the cache memory 300 and an increase in the hit rate.

What is claimed is:

1. An apparatus for cache lock control, comprising:

a cache memory having a plurality of data entries, each of said data entries including at least one data segment for storing data, at least one address segment for storing an address, and at least one cache lock segment for storing cache lock information; and means for controlling updating of said at least one data segment and said at least one address segment in any of the data entries of the cache memory in response to cache lock information in corresponding cache lock segments in said any of the data entries such that data segments and address segments of each of said plurality of data entries are selectively preventable from being overwritten by setting a corresponding cache lock segment, further including:

an address translator having a plurality of address entries, each of said address entries including at least a cache locking segment storing cache lock information corresponding to said cache memory;

means for selecting one of the data entries of said cache memory;

means for updating an address segment and a data segment in a selected data entry of said cache memory; and means for transferring cache lock information to a cache lock segment of the selected data entry of said cache memory from a cache locking segment in a corresponding address entry of said address translator when an address segment and a data segment in the selected data entry of said cache memory are updated.

2. An apparatus for cache lock control, comprising:

a cache memory having a plurality of data entries, each of said plurality of data entries being divided into a plurality of segments including: at least one data segment for storing data, at least one address segment for storing an address, and at least one cache lock segment for storing cache lock information;

means for controlling updating of said at least one data segment and said at least one address segment in any of the data entries of the cache memory in response to cache lock information in corresponding cache lock segments in said any of the data entries such that data segments and address segments of each of said plurality of data entries are selectively preventable from being overwritten by setting a corresponding cache lock segment therein;

an address translator having a plurality of address entries, each of said plurality of address entries divided into a plurality of segments including at least one cache locking segment storing cache lock information;

means for selecting one of the data entries of said cache memory;

means for updating a data segment and an address segment in a selected data entry of said cache memory; and means for transferring cache lock information to a cache lock segment of the selected data entry of said cache memory from a cache locking segment in a corresponding address entry of said address translator when a data segment and an address segment in the selected data entry of said cache memory are updated;

wherein said means for controlling includes:

a control register for storing information represented by a cache lock control bit, and means for selectively executing and inhibiting said updating of a data segment and an address segment in said any of the data entries of said cache memory in response to the information stored in the control register.

3. The apparatus for cache lock control recited in claim 2, wherein said address translator comprises means for translating a virtual address to a physical address of a memory thereby to identify one of a plurality of addresses of the memory for entering data therefrom to one of said data entries of said cache memory, and for providing said cache lock information to said cache lock segment of the said one of said data entries of said cache memory.

* * * * *